(12) United States Patent
Danner et al.

(10) Patent No.: US 6,624,930 B1
(45) Date of Patent: Sep. 23, 2003

(54) ILLUMINATION DEVICE FOR A DUV MICROSCOPE AND DUV MICROSCOPE

(75) Inventors: Lambert Danner, Wetzlar-Naunheim (DE); Frank Eisenkrämer, Biebertal (DE); Michael Veith, Wetzlar (DE); Wolfgang Vollrath, Burbach (DE); Martin Osterfeld, Wetzlar (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 342 days.

(21) Appl. No.: 09/589,088

(22) Filed: Jun. 8, 2000

(30) Foreign Application Priority Data

Oct. 7, 1999 (DE) .......................... 199 31 954

(51) Int. Cl.[7] .............................. F21V 9/04; F21V 9/06; G02B 5/08; G02B 5/20
(52) U.S. Cl. ...................... 359/359; 359/360; 359/368; 359/370
(58) Field of Search ................................ 359/385, 247, 359/263, 359, 586, 368, 370, 371, 386, 387, 358, 360, 361; 430/5; 362/157

(56) References Cited

U.S. PATENT DOCUMENTS

| | | | | |
|---|---|---|---|---|
| 3,798,435 A | * | 3/1974 | Schindl ...................... 359/388 |
| 4,669,811 A | * | 6/1987 | McQuoid ...................... 359/15 |
| 5,022,726 A | * | 6/1991 | Austin et al. ................ 359/360 |
| 5,117,150 A | * | 5/1992 | Schwarz et al. ............. 313/112 |
| 5,182,670 A | * | 1/1993 | Khan et al. .................. 252/588 |
| 5,449,413 A | * | 9/1995 | Beauchamp et al. ......... 136/257 |

* cited by examiner

Primary Examiner—Audrey Chang
Assistant Examiner—Joshua L Pritchett
(74) Attorney, Agent, or Firm—Foley & Lardner

(57) ABSTRACT

An illumination device for a DUV microscope has an illumination beam path, proceeding from a DUV light source in which are arranged a condenser and a reflection filter system which generates a DUV wavelength band and comprises four reflection filters. At these, the illumination beam is reflected in each case at the same reflection angle α, the illumination beam path extending coaxially in front of and behind the reflection filter system. According to the present invention, the reflection angle α=30° and the DUV wavelength band $\lambda_{DUV}+\Delta\lambda$ has a half-value width of max. 20 nm and a peak with a maximum value S of more than 90% of the incoming light intensity. The resulting very narrow half-value width of the DUV wavelength band makes it possible for the DUV objectives of the DUV microscope to be very well-corrected.

29 Claims, 7 Drawing Sheets

Reflection Filter System for Different $\lambda$, Incidence Angle $\alpha = 22.5°$

ILLUMINATION DEVICE FOR A DUV MICROSCOPE AND DUV MICROSCOPE

FIELD OF THE INVENTION

The invention refers to an illumination device for a DUV microscope. Furthermore, the invention refers to a DUV microscope having an illumination device.

BACKGROUND OF THE INVENTION

Illumination devices for DUV microscopes must make available a narrow DUV wavelength band from the DUV wavelength region (DUV=deep ultraviolet, approx. 200 to 300 nm) for the illumination for which the microscope optical system is corrected. The DUV wavelength band is characterized by the spectral peak value position and the half-value width of its peak. Both, narrow band transmission filter systems and reflection filter systems, are known for generation of a DUV wavelength band of this kind. These filter systems are inserted into the illumination beam path and filter out of the light spectrum of a light source a desired DUV wavelength band as the usable light. The microscope image is visualized with a DUV-sensitive TV camera.

Narrow-band transmission filter systems in the DUV yield very narrow peaks, but the maximum transmission and thus the maximum value of the peak is only approximately 20% of the light intensity before to the narrow-band transmission filter system. Such weak intensities, however, require particularly sensitive and therefore technologically complex and very expensive cameras. The essential disadvantage of these cameras, however (for example, in the case of so-called "frame transfer CCD imagers"), is that they have very long exposure and image readout times, so that "live" observation of the object is impossible. This is particularly problematic if the object stage with the object upon it needs to be shifted.

Known reflection filter systems comprise a plurality of reflective filters at each of which the light from the light source arrives and is reflected at an angle of incidence ($\alpha$=45°. With these known reflection filter systems, the maximum value of the peak is well over 90%. Their disadvantage, however, is the fact that their half-value width is approximately 30 to 50 nm. It is, however, extremely difficult and complex to correct microscope objectives with a short focal length, i.e. high magnification, in the DUV wavelength region for such a broad DUV wavelength band.

SUMMARY OF THE INVENTION

It is therefore the object of the invention to describe an illumination device for a DUV microscope which makes available a DUV wavelength band with maximum transmission and a narrow half-value width.

This object is achieved by an illumination as claimed in independent Claim 1. Advantageous embodiments of the illumination device are recited in the dependent claims.

It is a further object of the invention to provide an illumination device for a DUV microscope which allows switching between at least two different illumination wavelength bands. Furthermore, one of the wavelength bands is a DUV wavelength band having maximum transmission and a narrow half-value width.

This object is achieved by an illumination device as claimed in independent Claim 10. Advantageous embodiments of the illumination device are recited in the dependent claims.

It is another object of the invention to provide a DUV microscope with an illumination device which makes available a DUV wavelength band with maximum transmission and a narrow half-value width and which allows switching between at least two different illumination wavelength bands.

This object is achieved by a DUV microscope with an illumination device as claimed in independent Claim 25. Advantageous embodiments of the DUV microscope are recited in the dependent claims.

The invention is based on the idea that the large half-value widths are caused essentially by polarization effects in the reflection filter systems. These are much less for smaller reflection angles. A reflection filter system having small reflection angles and spectrally adapted reflection filters is therefore used in a DUV illumination system according to the present invention.

An illumination system according to the present invention for a DUV microscope has a light source from which an illumination beam path proceeds. Arranged in the illumination beam path are a condenser and a reflection filter system for generating a desired DUV wavelength band. The reflection filter system comprises four reflection filters at which the illumination beam is reflected, at the same reflection angle $\alpha$ in each case. The illumination beam extends coaxially in front of and behind the reflection filter system. According to the present invention, the reflection angle $\alpha$ at the individual reflection filters is $\alpha \leq 30°$.

The reflection filter system supplies a very narrow DUV wavelength band $\lambda_{DUV}+\Delta\lambda$ with a half-value width of max. 20 nm. It has a peak with a maximum value S of more than 90% of the incoming light intensity. Depending on the reflection filters used, a maximum value S of more than 98% of the incoming light intensity can be achieved with a reflection filter system using small angles of incidence. For that purpose, reflection filters matched specifically to the desired DUV wavelength band $\lambda_{DUV}+\Delta\lambda$ are used in the reflection filter system of the illumination device according to the present invention.

As a result of the transition to the small reflection angles $\alpha=30°$ according to the present invention in the reflection filter system, polarization effects at the reflection filters can be reduced and narrow half-value widths of this kind can be achieved. Appropriately corrected DUV microscope objectives can be computed for half-value widths of the desired order of magnitude. At the same time, a DUV microscope having an illumination device according to the present invention possesses sufficiently high intensities in the illumination beam to dispense with complex special DUV-sensitive cameras, for example the aforesaid frame transfer CCD cameras with their slow image buildup.

The subject matter of the invention is described in more detail with reference to the embodiments shown in the schematic drawings,

DETAILED DESCRIPTION OF THE INVENTION

Figure 1:
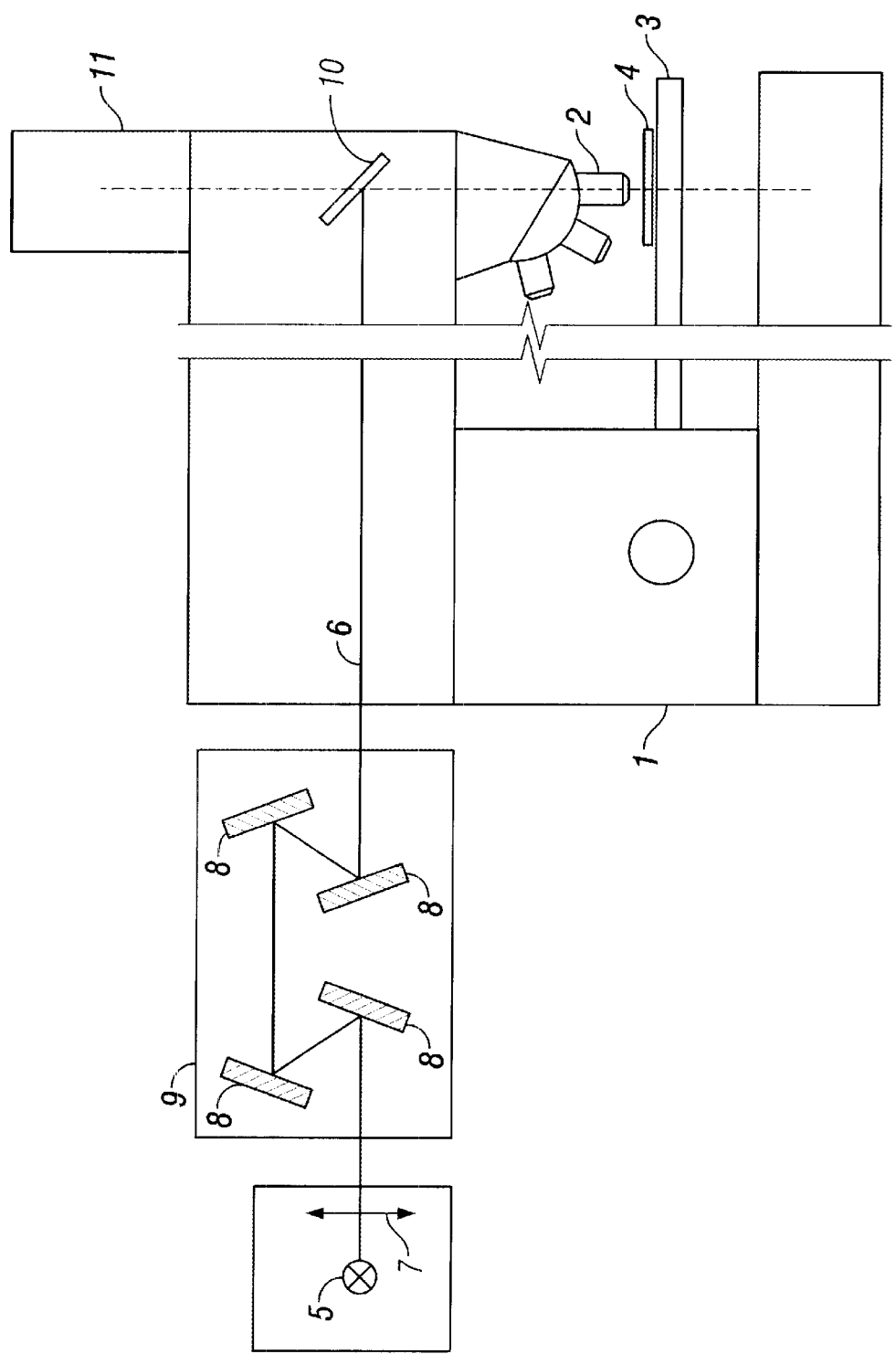
FIG. 1 shows a DUV illumination device for a microscope according to the invention.

FIG. 1 shows a microscope 1 having objectives 2 and an object 4 resting on an object stage 3. The DUV light source 5 used is, for example, a high-pressure mercury lamp with spectral components in the VIS, UV, and DUV wavelength regions (definition of spectral regions: VIS=visible; UV=ultraviolet; DUV=deep UV). An illumination beam 6 emerges from light source 5 and passes through a condenser 7 and a reflection filter system 9 made up of four reflection filters 8. From there, illumination beam 6 passes through an illumination optical system (not depicted), is deflected at a beam splitter 10, and is focused by objective 2 into object 4. The imaging beam proceeding from object 4 passes through objective 2 and beam splitter 10 to TV camera 11.

According to the present invention, reflection filters 8 in reflection filter system 9 are arranged so that illumination beam 6 encounters all reflection filters 8 at the same small angle of incidence α. An angle of 30° is depicted here. Smaller angles are possible according to the present invention, but reflection filter systems with angles of incidence α<15° are difficult to implement due to the tight geometry.

In the example depicted, reflection filters 8 adapted to the desired DUV wavelength region are vacuum-deposited films that are applied onto black glass. The desired DUV component of the lamp light is reflected. The components of the lamp light that pass through the vacuum-deposited films, i.e. the remaining DUV component and the UV and VIS components, are absorbed in the black glass. This yields an illumination having only the desired DUV wavelength region.

Figure 2:
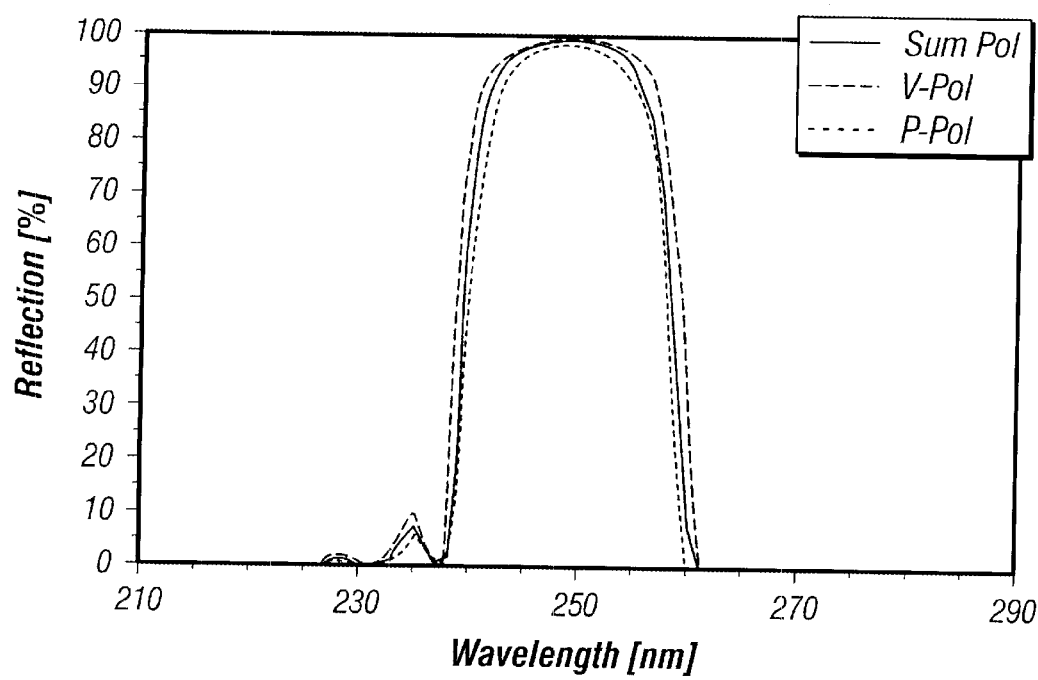
FIG. 2 shows wavelength-dependent reflection in a reflection filter system with a small angle of incidence $\alpha=22.5$, divided into polarization components.

FIG. 2 shows the reflection in a reflection filter system with a small angle of incidence α=22.5°, as a function of wavelength. The polarization components with vertical ("V pol") and parallel ("P pol") polarization directions resulting from polarization during reflection are shown. These two curves lie very close to one another, since the polarization effect is very small due to the small angle of incidence. The curve labeled "Sum pol" for the summed polarization of the two polarization directions therefore also has a very low half-value width λ with a value of approx. 20 nm. The DUV wavelength band $\lambda_{DUV}$ produced with a reflection filter system having a small angle of incidence is therefore sufficiently narrow that the DUV optical system of the microscope can be corrected for it.

Figure 3:
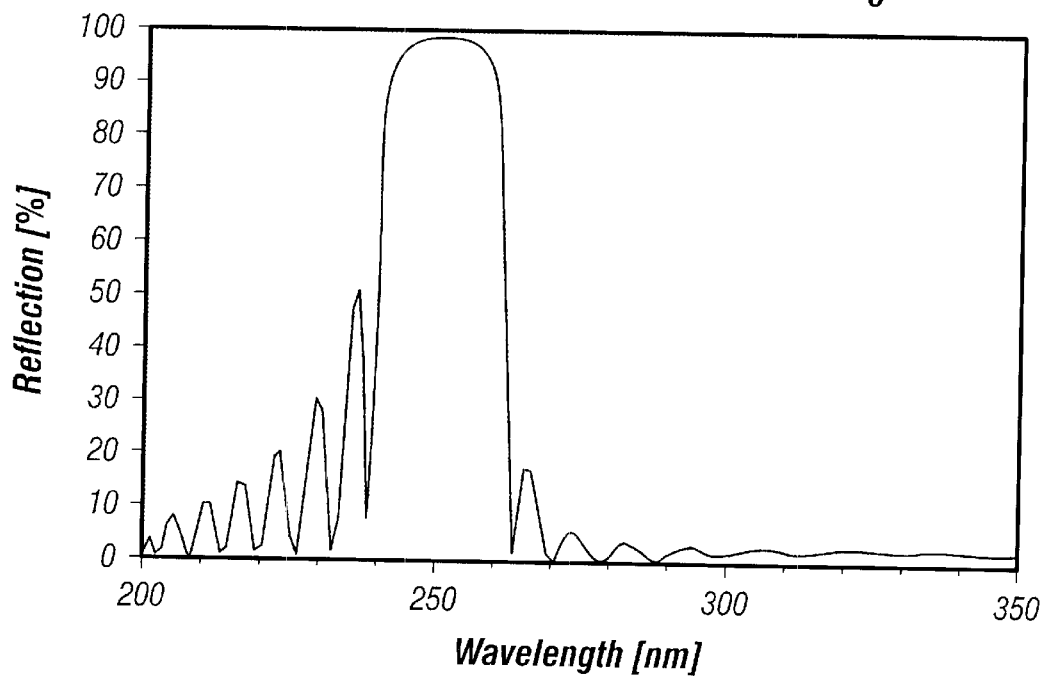
FIG. 3 shows wavelength-dependent reflection at a single reflection filter for an angle of incidence $\alpha=15°$ and a reference wavelength $\lambda_0=303.5$ nm.
Figure 4:
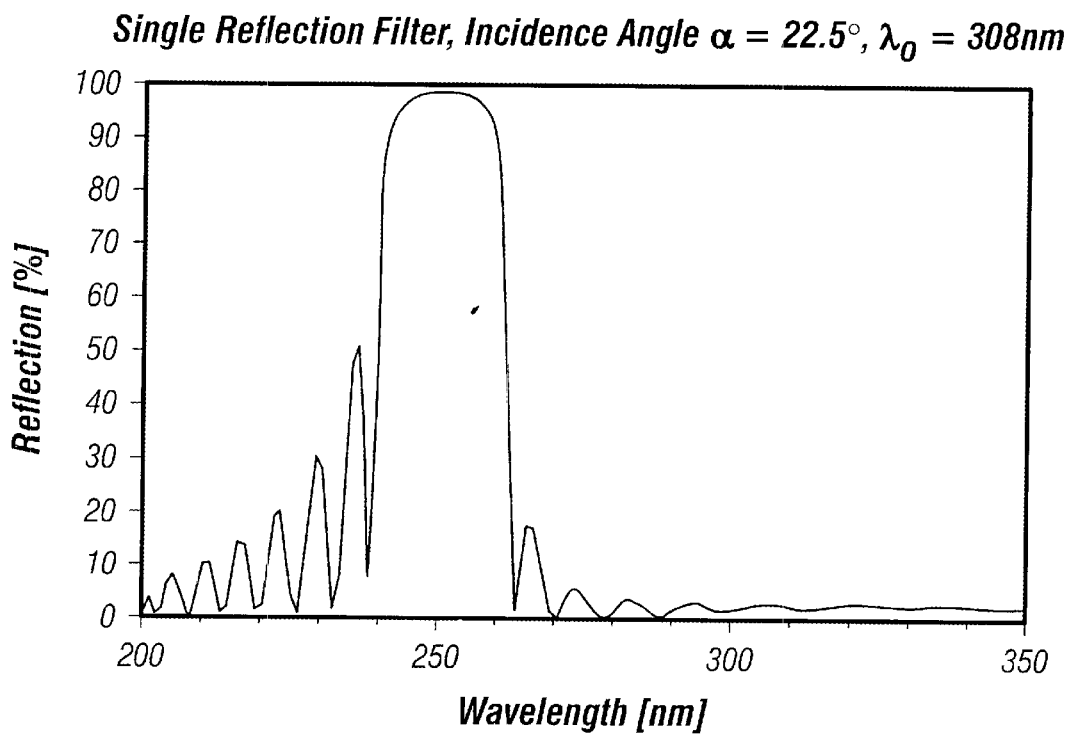
FIG. 4 shows wavelength-dependent reflection at a single reflection filter for an angle of incidence $\alpha=22.5°$ and a reference wavelength $\lambda_0=308$ nm.
Figure 5:
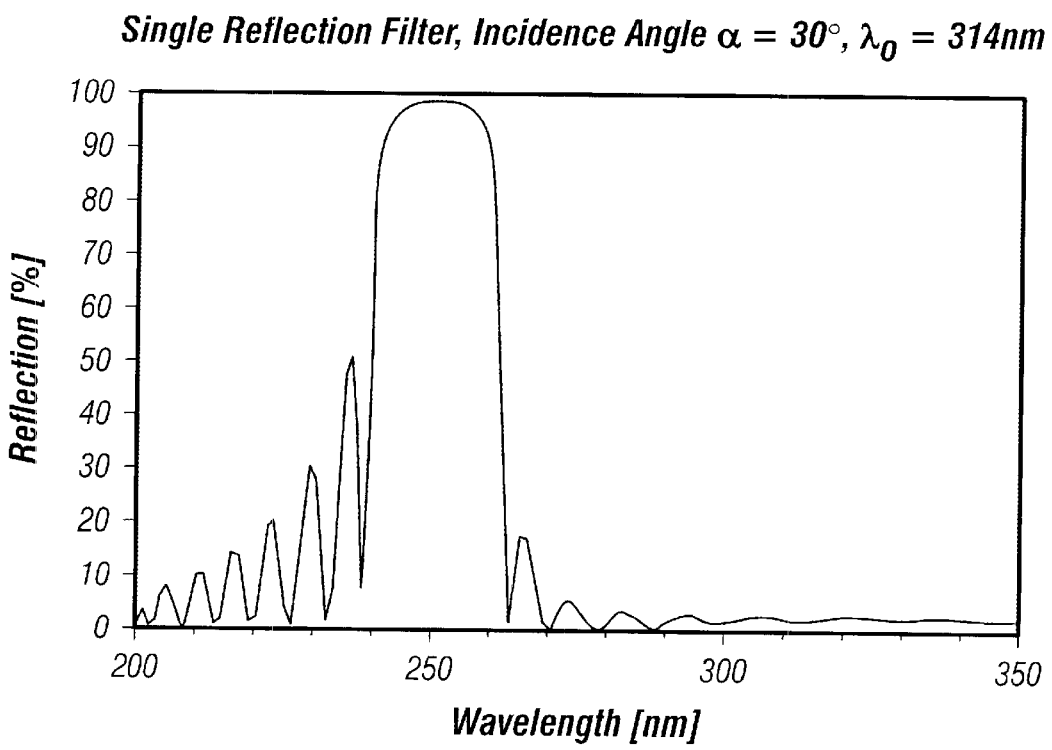
FIG. 5 shows wavelength-dependent reflection at a single reflection filter for an angle of incidence α=30° and a reference wavelength $\lambda_0$=314 nm.

FIGS. 3 through 5 show the wavelength-dependent reflection at different individual reflection filters designed for different angles of incidence α.

Figure 6:
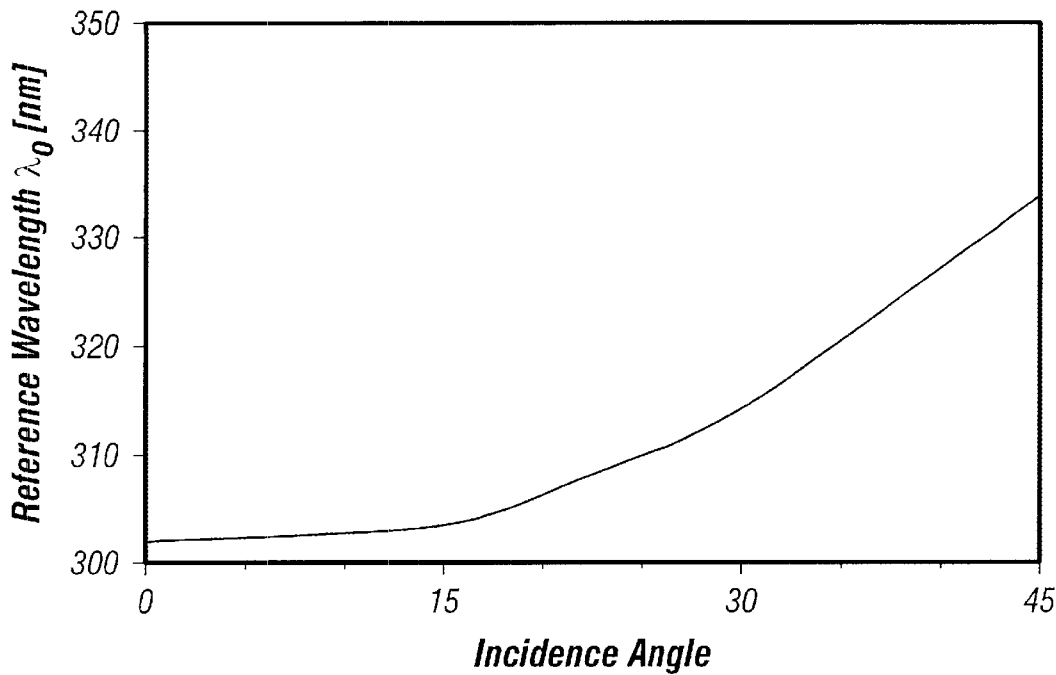
FIG. 6 shows the reference wavelength $\lambda_0$ as a function of angle of incidence α.

The reflection filters possess a layer structure as indicated in Table 1. Only the thicknesses of the layers are corrected, in accordance with the desired angle of incidence α, by way of a reference wavelength $\lambda_0$ that is incorporated into the calculation of the layer thicknesses. The associated reference wavelengths $\lambda_0$ are indicated in the Figures. As a result of the adaptation of the layer thicknesses, the reflection filters possess qualitatively identical reflection characteristics even for different angles of incidence. FIG. 6 depicts the reference wavelength $\lambda_0$ as a function of the angle of incidence α. It is evident that the reference wavelength $\lambda_0$ needs much more correction for changes toward greater angles of incidence.

Figure 7:
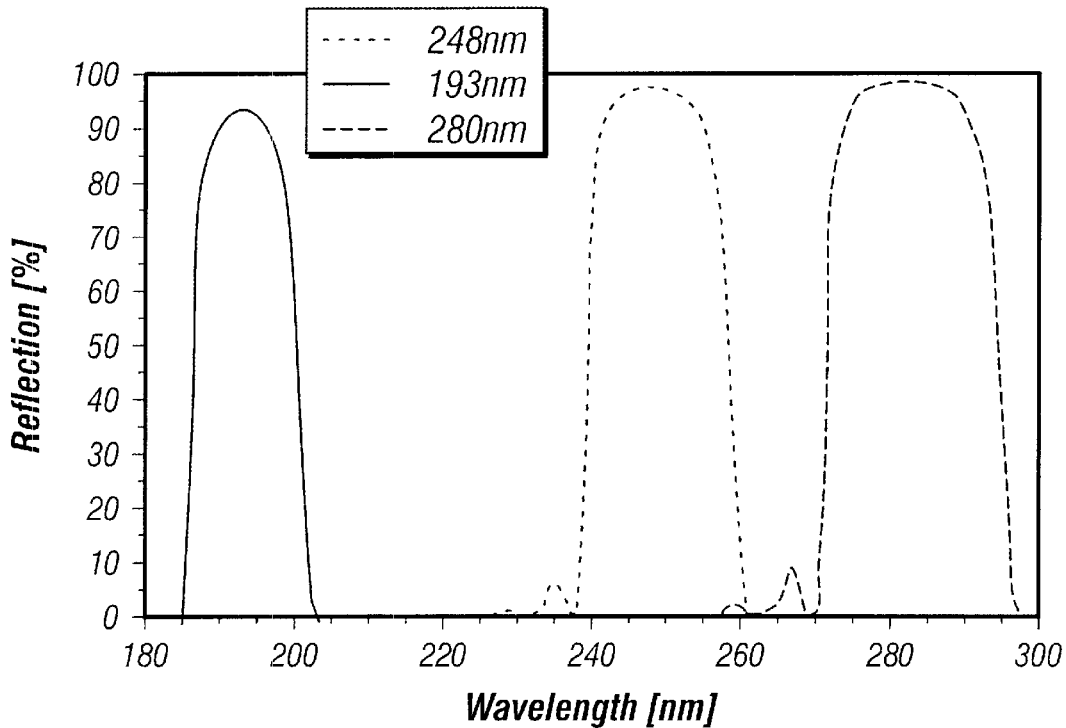
FIG. 7 shows wavelength-dependent reflection for three reflection filter systems adapted to different DUV wavelengths, with an angle of incidence α=22.5° in each case.

FIG. 7 shows the wavelength-dependent reflection for three reflection filter systems, adapted to three different DUV wavelengths, whose reflection filters are each designed for the same angle of incidence α=22.5°. The layer system from Table 1, for example, is once again suitable. It is also possible, however, to imagine other layer systems, for example using $SiO_2$ and $AlO_3$. It is important in this context to use materials with the smallest possible differences in their refractive indices. With the layer system of Table 1, it is possible to describe a reflection filter system that, at least for a DUV wavelength between 180 and 300 nm, matches a narrow DUV wavelength band in each case.

Two exemplary embodiments of an illumination device that can be switched over to different wavelength regions will be explained below.

Figure 8:
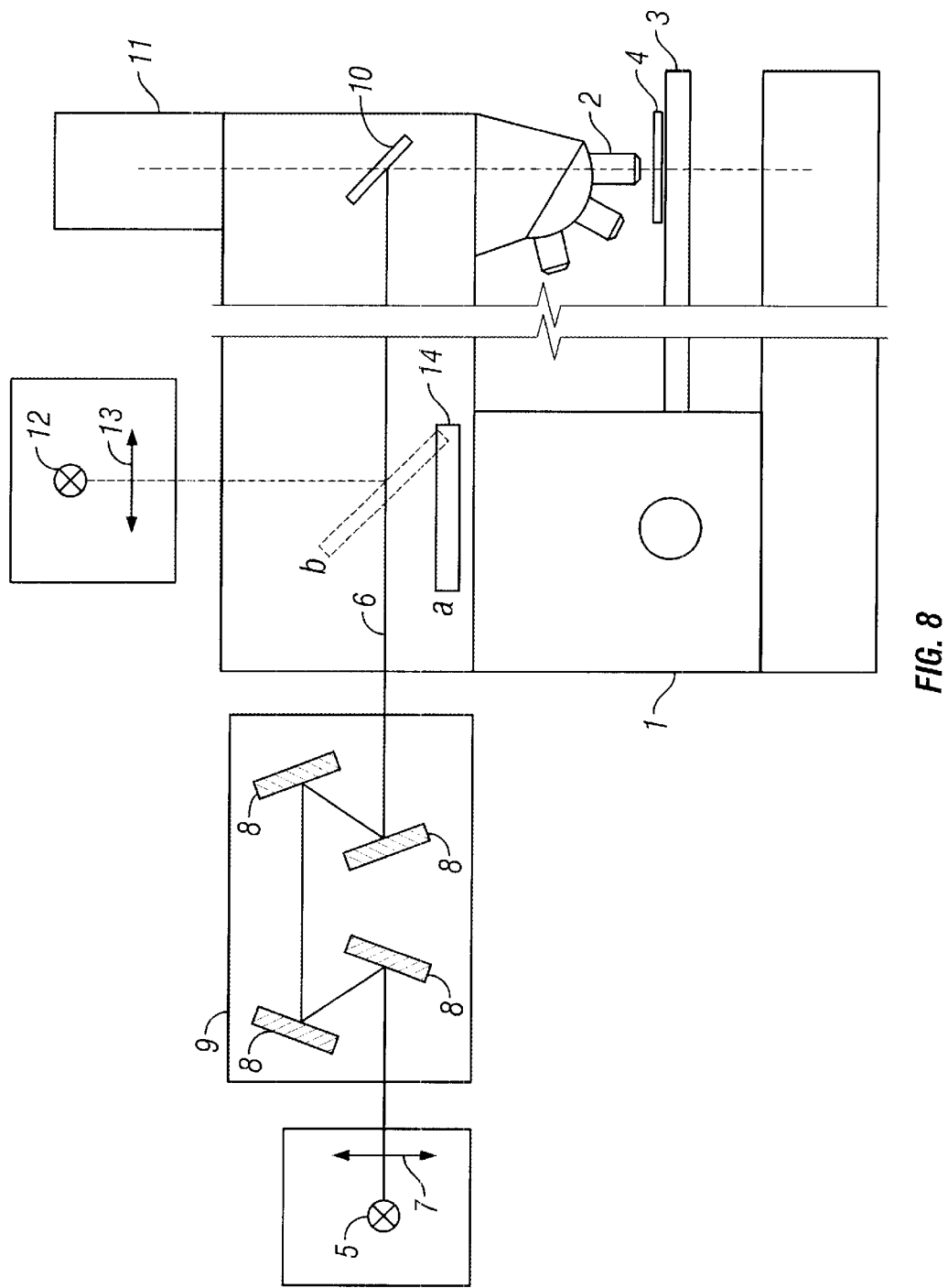
FIG. 8 shows a DUV microscope having a switchable illumination device for selectable VIS or DUV illumination, having two separate VIS and DUV light sources.

FIG. 8 shows a DUV microscope having 1 a switchable illumination device for selectable VIS or DUV illumination that is equipped with two separate light sources for two wavelength regions. The configuration corresponds, in principle, to that of FIG. 1, and identical components have identical reference characters. An additional VIS light source 12 for the visible spectral region is added to the previously described illumination device of FIG. 1 having DUV light source 5. This VIS light source 12 is, for example, a mercury bulb that radiates spectral components only in the VIS wavelength region, but none in the UV or DUV wavelength region.

The light from this VIS light source 12 passes through a condenser 13 and is coupled perpendicularly into illumination beam path 6 only when an additionally installed pivotable mirror 14 in illumination beam path 6 is in position "b". The VIS light then passes along the subsequent portion of illumination beam path 6 to object 4. In order to select DUV illumination, pivoting mirror 14 is brought into position "a". The light from DUV light source 5 then arrives at object 4, as shown in FIG. 1.

The configuration just described does require a second light source, but is easy to implement by way of pivoting mirror 14. In addition, the configuration greatly expands the usability of the microscope. For example, DUV light source 5, e.g. a mercury arc lamp, also radiates in the UV and VIS wavelength region. But it possesses only a small arc, which in the case of weaker VIS objectives cannot fill the pupil and thus cannot provide illumination for these objectives. DUV light source 5 is also not dimmable.

The VIS light source, on the other hand, for example a halogen incandescent bulb, possesses a filament of sufficient size for adequate illumination even with weaker VIS objectives, and is dimmable. Its spectrum has no UV or DUV components. With the configuration described, it is thus possible to equip a DUV microscope with all the capabilities of VIS examination.

Figure 9:
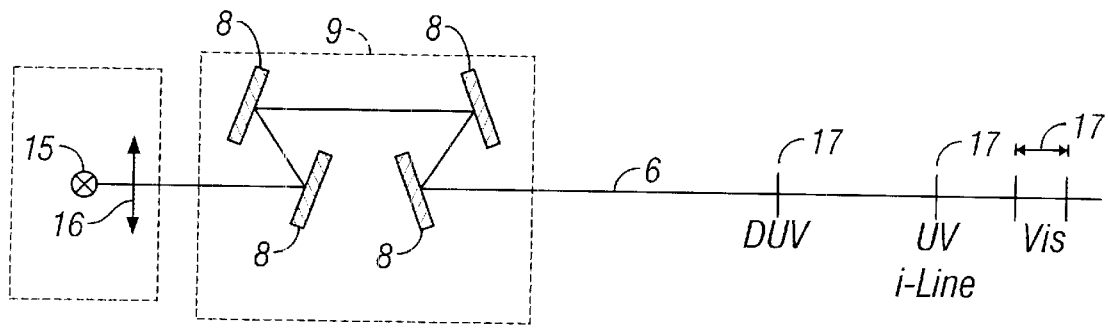
FIG. 9 shows the location of the lamp images for VIS, UV, and DUV in a DUV illumination device having a universal DUV-VIS light source.

If it is desirable to implement a configuration having only one light source, the shifting of the image of the light source for various wavelengths must be taken into account. FIG. 9 depicts the different positions of the images of a universal light source for the VIS and UV and DUV wavelength regions in a DUV illumination device. The light from light source 15 passes through a condenser 16 and a reflection filter system 9 that is made up of four reflection filters 8. Reflection filters 8 are vacuum-deposited onto black glass.

The various positions of image 17 of light source 15 for the DUV wavelength 248 nm, the so-called "i-line" at 365 nm, and the visible VIS wavelength region are depicted schematically. In order to retain image 17 of light source 15 in one position, light source 15 would need to be displaced in the direction of illumination beam path 6 for the different spectral illumination methods.

Figure 10:
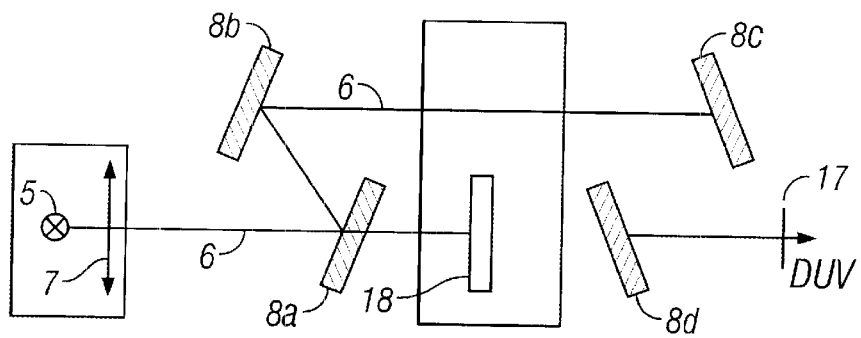
FIG. 10 shows a switchable illumination device for selectable VIS or DUV illumination with a universal DUV-VIS light source, in its "DUV illumination" setting.
Figure 11:
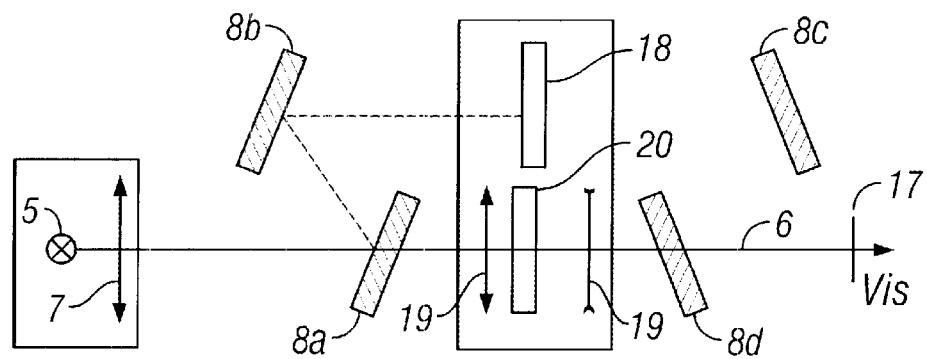
FIG. 11 shows the switchable illumination device of FIG. 10 for selectable VIS or DUV illumination with a universal DUV-VIS light source, in its "VIS illumination" setting.

An alternative to this is shown in FIGS. 10 and 11. These each depict a switchable illumination device for selectable VIS or DUV illumination that operates with only one universal DUV-VIS light source. DUV light source 5, which for example is a mercury arc lamp, is used for this. Proceeding from DUV light source 5 is an illumination beam path 6 in which a condenser 7 and a reflection filter system 9 having four reflection filters 8 are arranged. The four reflection filters 8 are in this case individually labeled 8a, 8b, 8c, and 8d in order to distinguish their spatial positions. In this example, reflection filters 8a, 8b, 8c, and 8d are vacuum-deposited onto a support material that is transparent at all wavelength regions, i.e. quartz glass.

FIG. 10 shows the above-described illumination device in the "DUV illumination" setting. In this, a light stopper 18 is inserted between reflection filter 8a and reflection filter 8d. This can be an opaque plate of any kind, for example made of metal. This blocks the component of the lamp light passing through reflection filter 8a, so that only the reflected DUV wavelength band is used for illumination. Position 17 of the image of light source 5 is indicated.

FIG. 11 shows the above-described illumination device in the "VIS illumination" setting. In this, a combination of lenses 19 and at least one filter 20, selected for the VIS region, are inserted between reflection filter 8a and reflection filter 8d. Lenses 19 shift the position 17 of the VIS image of the light source to the position of the DUV image of the light source. Filter 20 can be a color filter, neutral-density filter, etc. A light stopper 18 is inserted between reflection filter 8b and reflection filter 8d so as to exclude any DUV component from the illumination during VIS illumination.

Figure 12:
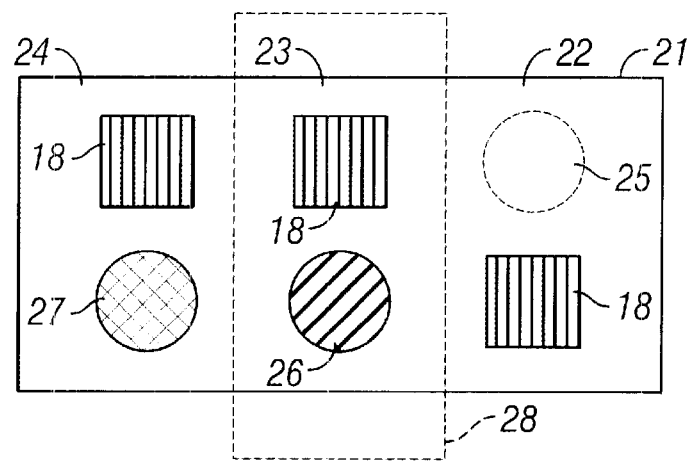
FIG. 12 shows the linear slider for the switchable illumination device of FIGS. 10 and 11, with three switchable sections.

FIG. 12 shows a linear slider 21 with which the two settings of FIGS. 10 and 11, and a further setting, can be implemented. Linear slider 21 comprises three switching sections 22, 23, 24 for different spectral illumination variants. Linear slider 21 is inserted perpendicularly into illumination beam path 6 into reflection filter system 9, so that its upper half is always located between reflection filter 8b and reflection filter 8c, and its lower half always between reflection filter 8a and reflection filter 8d. Only one of switching sections 22, 23, 24 at a time is selectably inserted into illumination beam path 6. Position 28 of the reflection filter system is depicted by a dashed border. In FIG. 12, switching section 23 is therefore currently inserted into the reflection filter system.

Switching section 22 generates DUV illumination, i.e. corresponds to FIG. 10. A clear opening 25 is arranged in its upper half in order to allow DUV light to pass. A light stopper 18 is arranged in its lower half, in accordance with FIG. 10.

Switching section 23 generates VIS illumination, i.e. corresponds to FIG. 11. A light stopper 18 is arranged in its lower half in order to block out the DUV light. In accordance with FIG. 11 a lens/filter combination 26 made up of lenses and at least one filter, selected for the VIS region, is inserted into its lower half. The lenses correct the position of the image of the light source. The filters can be selected as desired, e.g. color filters, neutral-density filters, fluorescence filters, etc.

With switching section 24, a further illumination with wavelengths outside the DUV wavelength band can be established. Once again, a light stopper 18 is arranged in its upper half in order to block out DUV light. Any desired lens/filter combination 27, for example one selected for the so-called "i-line" at 365 nm, is inserted in its lower half.

By displacing linear slider 21, it is easy to switch between the various spectral illumination variants (DUV, VIS, and, for example, "i-line"). A further advantage in terms of eye safety is achieved here, given the very high light intensities of light source 5, for example in the form of a mercury arc lamp. In the "DUV" position, so little light energy is in any case allowed to pass that eye safety is attained. In all the positions that do not implement DUV illumination, however, all of the remaining light energy outside the narrow DUV wavelength band is allowed to pass through reflection filter 8a. In these positions, however, filters 20 are always arranged in illumination beam path 6. Because sufficient intensity damping takes place in this context by appropriate selection of filters 20, consistently eye-safe operation of microscope 1 is easily ensured.

The invention has been described in detail with particular reference to certain preferred embodiments thereof, but it will be understood that variations and modifications can be effected within the spirit and scope of the invention.

TABLE 1

Layer configuration of a reflection filter
$L = Al_2O_3$; $S = SiO_2$; $\lambda_0 = 308$ nm; $\alpha = 22.5°$

| No. | Thickness [$\lambda_0/4$] | Material | No. | Thickness [$\lambda_0/4$] | Material |
|---|---|---|---|---|---|
| 1 | 0.25 | L | 29 | 0.92 | L |
| 2 | 0.94 | S | 30 | 0.72 | S |
| 3 | 0.66 | L | 31 | 0.92 | L |
| 4 | 0.72 | S | 32 | 0.72 | S |
| 5 | 0.92 | L | 33 | 0.92 | L |
| 6 | 0.72 | S | 34 | 0.72 | S |
| 7 | 0.92 | L | 35 | 0.92 | L |
| 8 | 0.72 | S | 36 | 0.72 | S |
| 9 | 0.92 | L | 37 | 0.92 | L |
| 10 | 0.72 | S | 38 | 0.72 | S |
| 11 | 0.92 | L | 39 | 0.92 | L |
| 12 | 0.72 | S | 40 | 0.72 | S |
| 13 | 0.92 | L | 41 | 0.92 | L |
| 14 | 0.72 | S | 42 | 0.72 | S |
| 15 | 0.92 | L | 43 | 0.92 | L |
| 16 | 0.72 | S | 44 | 0.72 | S |
| 17 | 0.92 | L | 45 | 0.92 | L |
| 18 | 0.72 | S | 46 | 0.72 | S |
| 19 | 0.92 | L | 47 | 0.92 | L |
| 20 | 0.72 | S | 48 | 0.72 | S |
| 21 | 0.92 | L | 49 | 0.92 | L |

TABLE 1-continued

Layer configuration of a reflection filter
$L = Al_2O_3$; $S = SiO_2$; $\lambda_o = 308$ nm; $\alpha = 22.5°$

| No. | Thickness [$\lambda_o/4$] | Material | No. | Thickness [$\lambda_o/4$] | Material |
|---|---|---|---|---|---|
| 22 | 0.72 | S | 50 | 0.72 | S |
| 23 | 0.92 | L | 51 | 0.92 | L |
| 24 | 0.72 | S | 52 | 0.72 | S |
| 25 | 0.92 | L | 53 | 0.92 | L |
| 26 | 0.72 | S | 54 | 0.67 | S |
| 27 | 0.92 | L | 55 | 0.68 | L |
| 28 | 0.72 | S | 56 | 1.75 | S |

PARTS LIST

| | |
|---|---|
| 1 | Microscope |
| 2 | Objective |
| 3 | Object stage |
| 4 | Object |
| 5 | DUV light source |
| 6 | Illumination beam (path) |
| 7 | Condenser |
| 8 | Reflection filter, also 8a, 8b, 8c, 8d |
| 9 | Reflection filter system |
| 10 | Beam splitter |
| 11 | TV camera |
| 12 | VIS light source |
| 13 | Condenser |
| 14 | Pivotable mirror |
| 15 | Universal DUV-VIS light source |
| 16 | Condenser |
| 17 | Image of the light source |
| 18 | Light stopper |
| 19 | Lenses |
| 20 | Filter |
| 21 | Linear slider |
| 22 | Switching section for DUV illumination |
| 23 | Switching section for VIS illumination |
| 24 | Switching section for a further illumination |
| 25 | Clear opening |
| 26 | Lens/filter combination for VIS illumination |
| 27 | Lens/filter combination for a further illumination |
| 28 | Position of the reflection filter system |

What is claimed is:

1. An illumination device for a DUV ("Deep Ultra Violet") microscope, comprising:
   a DUV light source defining an illumination beam path;
   a condenser and a reflection filter system arranged in said illumination beam path wherein said reflection filter system comprises four reflection filters at which an illumination beam is reflected in each case at the same reflection angle $\alpha$ and generates a DUV wavelength band $\lambda_{DUV}+\Delta\lambda$, wherein the illumination beam path extends coaxially in front of and behind the reflection filter system, wherein each reflection angle $\alpha$ is less than 30° and the DUV wavelength band $\lambda_{DUV}+\Delta\lambda$ has a half-value width of max. 20 nm and a peak intensity of outgoing light is at least 90% of the incoming light intensity.

2. The illumination device as defined in claim 1, wherein the reflection angle $\alpha=22.5°$.

3. The illumination device as defined in claim 1, wherein the intensity of the outgoing light is about 98% of the incoming light intensity.

4. The illumination device as defined in claim 1, wherein the DUV wavelength band $\lambda_{DUV}+\Delta\lambda$ lies between 200 nm and 300 nm.

5. The illumination device as defined in claim 1, wherein each reflection filter is an interference filter system having a plurality of layers of $Al_2O_3$ and $SiO_2$, alternatingly deposited onto a substrate, whose thicknesses are derived from a reference wavelength $\lambda_0$; and the layers are constructed in accordance with Table 1.

6. The illumination device as defined in claim 5, wherein the substrate consists essentially of a transparent or opaque material.

7. The illumination device as defined in one of claim 5, wherein the reflection angle $\alpha=15°$ and the reference wavelength $\lambda_0=303.5$ nm.

8. The illumination device as defined in one of claim 5, wherein the reflection angle $\alpha=22.5°$ and the reference wavelength $\lambda_0=308$ nm.

9. The illumination device as defined in one of claim 5, wherein the reflection angle $\alpha=30°$ and the reference wavelength $\lambda_0=314$ nm.

10. An illumination device for a DUV ("Deep Ultra Violet") microscope, comprising:
    a DUV light source defining an illumination beam path;
    a condenser and a reflection filter system arranged in said illumination beam path, wherein said reflection filter system comprises four reflection filters at which an illumination beam is reflected in each case at the same reflection angle $\alpha$ and generates a DUV wavelength band $\lambda_{DUV}+\Delta\lambda$, wherein the illumination beam path extends coaxially in front of and behind the reflection filter system, wherein each reflection angle $\alpha$ is $\alpha \leq 30°$ and the DUV wavelength band $\lambda_{DUV}+\Delta\lambda$ has a half-value width of max. 20 nm and a peak intensity of outgoing light is at least 90% of the incoming light intensity;
    a VIS ("Visible") light source for the visible VIS spectral region is arranged in the vicinity of the illumination beam path; and
    an optical switch for selectably switching between DUV illumination and VIS illumination.

11. The illumination device as defined in claim 10, wherein the optical switch comprises a mirror that can be pivoted into and out of the illumination beam path, for alternatively coupling DUV light and VIS light into the beam path.

12. The illumination device as defined in claim 10, wherein an additional optical switch is arranged in the vicinity of the illumination beam path which exclusively brings the DUV wavelength band $\lambda_{DUV}+\Delta\lambda$ from the light of the DUV light source into the illumination beam path and suppress the other spectral components, or vice versa.

13. The illumination device as defined in claim 12, wherein the reflection filters are deposited onto a transparent material and the optical switch and the additional optical switch are reversibly movable into the reflection filter system.

14. The illumination device as defined in claim 13, wherein the optical switch consists essentially of light stoppers, lenses, and filters.

15. The illumination device as defined in claim 13, wherein the optical switch is arranged on a linear slider slidable into the reflection filter system and having a plurality of switching sections that can be inserted into the illumination beam path, such that
    a first switching section having a light stopper is insertable behind the first reflection filter and generating a DUV illumination; and
    at least one second switching section having a light stopper is insertable behind the second reflection filter and having a filter/lens combination being inserted behind the first reflection filter at the same time and generating an illumination in another spectral region different from DUV.

16. The illumination device as defined in claim 15, wherein the linear slider has a second or additional further switching section having filters for fluorescent illumination.

17. The illumination device as defined in claim 10, wherein the reflection angle $\alpha=22.5°$.

18. The illumination device as defined in claim 10, wherein the intensity of the outgoing light is about 98% of the incoming light intensity.

19. The illumination device as defined in claim 10, wherein the DUV wavelength band $\lambda_{DUV}+\Delta\lambda$ lies between 200 nm and 300 nm.

20. The illumination device as defined in claim 10, wherein each reflection filter is an interference filter system having a plurality of layers of $Al_2O_3$ and $SiO_2$, alternatingly deposited onto a substrate, whose thicknesses are derived from a reference wavelength $\lambda_0$; and the layers are constructed in accordance with Table 1.

21. The illumination device as defined in claim 20, wherein the substrate consists essentially of a transparent or opaque material.

22. The illumination device as defined in one of claim 20, wherein the reflection angle $\alpha=15°$ and the reference wavelength $\lambda_0=303.5$ nm.

23. The illumination device as defined in one of claim 20, wherein the reflection angle $\alpha=22.5°$ and the reference wavelength $\lambda_0=308$ nm.

24. The illumination device as defined in one of claim 20, wherein the reflection angle $\alpha=30°$ and the reference wavelength $\lambda_0=314$ nm.

25. A DUV ("Deep Ultra Violet") microscope having an illumination device, comprising:
a DUV light source defining an illumination beam path;
a condenser and a reflection filter system arranged in said illumination beam path, wherein said reflection filter system comprises four reflection filters at which an illumination beam is reflected in each case at the same reflection angle $\alpha$ and generates a DUV wavelength band $\lambda_{DUV}+\Delta\lambda$, wherein the illumination beam path extends coaxially in front of and behind the reflection filter system, wherein each reflection angle $\alpha$ is $\alpha \leq 30°$ and the DUV wavelength band $\lambda_{DUV}+\Delta\lambda$ has a half-value width of max. 20 nm and a peak intensity of outgoing light is at least 90% of the incoming light intensity;
a VIS ("Visible") light source for the visible VIS spectral region is arranged in the vicinity of the illumination beam path; and
an optical switch for selectably switching between DUV illumination and VIS illumination.

26. The DUV microscope as defined in claim 25, wherein the optical switch comprises a mirror that can be pivoted into and out of the illumination beam path, for alternatively coupling DUV light and VIS light into the beam path.

27. The DUV microscope as defined in claim 25, wherein an additional optical switch is arranged in the vicinity of the illumination beam path which exclusively brings the DUV wavelength band $\lambda_{DUV}+\Delta\lambda$ from the light of the DUV light source into the illumination beam path and suppress the other spectral components, or vice versa.

28. The DUV microscope as defined in claim 27, wherein the reflection filters are deposited onto a transparent material and the optical means are reversible movable into the reflection filter system.

29. The DUV microscope as defined in claim 28, wherein the optical switch consists essentially of light stoppers, lenses, and filters.

* * * * *